3,264,377
BLENDS OF POLYVINYL CHLORIDE WITH HOMO-POLYMERS AND COPOLYMERS OF ALKYL β-VINYLPROPIONATE
James E. Masterson, Moorestown, N.J., assignor to Rohm & Haas Company, Philadelphia, Pa., a corporation of Delaware
No Drawing. Filed June 22, 1962, Ser. No. 204,602
8 Claims. (Cl. 260—897)

This invention relates to homopolymers and copolymers of alkyl β-vinylpropionates, methods of preparing such polymers and copolymers, and blends thereof with polyvinyl chloride and copolymers of vinyl chloride in preponderance with other monomers.

Alkyl β-vinylpropionates are known compounds. See, for example, E. J. Boorman et al., J.C.S., 568 (1933).

It has now been found that homopolymers of alkyl β-vinylpropionates and copolymers thereof with other monomers, such as ethylene, ethyl acrylate, diethyl fumarate and diethyl maleate, possess a unique combination of properties that make them particularly suitable for use as plasticizers for polyvinyl chloride and copolymers containing a preponderance of vinyl chloride. In particular, good flexibility without sacrifice of other desirabl properties is imparted to polyvinyl chloride when said polymers and/or copolymers are blended therewith. Furthermore, such blends are unique in that they possess exceptional permanence as evidenced by their low volatility and hexane extraction values coupled with good volume resistivity.

The alkyl β-vinylpropionates of particular interest are those in which the alkyl group contains one to four carbon atoms. These compounds can be polymerized or copolymerized with other monomers having polymerizable ethylenic unsaturation, such as ethylene, ethyl acrylate, diethyl fumarate and diethyl maleate in amounts up to about 75%, with free radical initiators. Such initiators are used at levels of from about 0.1 to about 15 mole percent. The preferred range is 3 to 10 mole percent. Common free radical initiators may be used, for example t-butyl peracetate, di-t-butyl peroxide, diisobutylene ozonide, and other olefin ozonides.

The polymers and copolymers of particular concern are those having a molecular weight within the range of about 500 to about 2500, and preferably 1000 to 1500.

The following examples illustrate the preparation of typical polymers and copolymers within the scope of this invention.

*Example 1.—Homopolymerization of ethyl β-vinylpropionate using t-butyl peracetate as catalyst*

Ethyl β-vinylpropionate, 256 g., and t-butyl peracetate, 17.60 g., were charged to a stirred reactor equipped for reflux and heated to 115° C. The temperature was then slowly raised to 135° C. over a 5 hour period. The product was stripped of volatile materials to a temperature of 190° C. at 0.15 mm. of Hg pressure. There remained as a pot residue 112.3 g. of the homopolymer of ethyl β-vinylpropionate, which had a molecular weight of 929±17 and a Gardner Holdt viscosity of T.

*Example 2. — Homopolymerization of ethyl β-vinylpropionate using diisobutylene ozonide as a catalyst*

Using 218 g. of ethyl β-vinylpropionate and 27.3 g. of diisobutylene ozonide added as an 18.1% solution in Skelly Solvent "C," an 85.4 g. yield of the homopolymer of ethyl β-vinylpropionate was obtained, having a molecular weight of 672 and a Gardner Holdt viscosity of N+.

*Example 3.—Copolymerization of ethyl β-vinylpropionate and ethyl acrylate*

Ethyl β-vinylpropionate, 230.4 g., ethyl acrylate, 25.6 g., and t-butyl peracetate, 17.6 g., were charged to a stirred reactor equipped for reflux and heated to 100° C. The temperature was then slowly raised to 137° C. over a 2.5 hour period. The product was stripped to a temperature of 202° C. at a pressure of 0.15 mm. of Hg. There remained as a pot residue 158.0 g. of a copolymer of ethyl β-vinylpropionate and ethyl acrylate, having a molecular weight of 1530±50 and a Gardner Holdt viscosity of $Z_1+$.

*Example 4.—Copolymerization of ethylene and ethyl β-vinylpropionate*

Ethylene, 84 g., was introduced to a chilled (−40° C.) reservoir from a cylinder of known volume. Ethyl β-vinylpropionate, 384 g., hexane, 192 g., and 97% di-t-butyl peroxide, 45.2 g., were added to the reservoir and the reactants were mixed with ethylene by stirring. The reservoir contents were pressurized to 500 p.s.i. with nitrogen, and the entire reaction mixture was metered by means of a high pressure proportioning pump into a coil reactor of 8 ml. volume. The latter was immersed in a constant temperature bath held at 250° C. The reaction pressure in the hot coil was 5000 p.s.i. and was maintained by a high pressure let-down valve and control system. The rate of feed of reactants was so adjusted that the effluent from the hot coil was collected (via the let-down valve) at about 4 g. per minute; gaseous effluent was permitted to escape to the atmosphere. The total running time was 131 minutes and a total of 579.3 g. of liquid products was obtained. Forerun and afterrun, totaling 131.2 g., were discarded and a center cut of 448.1 g. stripped to a flask temperature of 200° C. at a vacuum of less than 1 mm. of Hg. There was obtained 128.3 g. of a copolymer of ethyl β-vinylpropionate and ethylene with a molecular weight of 744 and a Gardner Holdt viscosity of E—. The ratio of ethylene to ethyl β-vinylpropionate was 1.06 as calculated from a carbon analysis of 69.42%.

The following table shows values found as a result of standard tests run on blends of a commercially available polyvinyl chloride (Geon 101) with the homopolymer of Example 1 and the copolymer of Example 3, when compared with blends in equal amounts of the same polyvinyl chloride with a commercially available polyester plasticizer (Paraplex G–50) and with a monomeric plasticizer (dioctyl phthalate).

TABLE

| Plasticizer | AC [1] Volatility, percent | Hexane [2] Extraction, percent | Volume Resistivity [3] | |
| --- | --- | --- | --- | --- |
| | | | 90° C. "Dry" | 60° C. "Wet" |
| Example 1 | 2.2 | 5.9 | 0.71 | 0.76 |
| Example 3 | 1.5 | 3.5 | 1.0 | 1.0 |
| Paraplex G–50 | 1.1 | 3.7 | 0.03 | 0.01 |
| Dioctyl phthalate | 8.5 | 29.0 | 1.0 | 1.3 |

[1], [2] Blends of PVC (60%) and Plasticizer (40%).
[3] Blends of PVC (65%) and Plasticizer (35%).

From the above table it is evident that the polymers of present concern when blended with PVC show a high degree of permanence plus good electrical properties. It is evident, therefore, that they represent a substantial advance in the art.

What is claimed is:
1. A blend of (a) a member of the group consisting of polyvinyl chloride and copolymers of vinyl chloride with a minor amount of another monomer copolymerizable therewith and (b) a member of the group consisting of homo- polymers of an alkyl β-vinylpropionate in which the alkyl group contains one to four carbon atoms and copolymers thereof with another monomer copolymerizable therewith.

2. A blend as in claim 1 wherein (b) is a homopolymer as therein defined.

3. A blend as in claim 1 wherein (b) is a copolymer as therein defined.

4. A blend as in claim 1 wherein (b) is a homopolymer of methyl β-vinylpropionate.

5. A blend as in claim 1 wherein (b) is a homopolymer of ethyl β-vinylpropionate.

6. A blend as in claim 1 wherein (b) is a copolymer of an alkyl β-vinylpropionate having one to four carbon atoms in the alkyl group and ethyl acrylate.

7. A blend as in claim 1 wherein (b) is a copolymer of an alkyl β-vinylpropionate having one to four carbon atoms in the alkyl group and ethylene.

8. A blend as in claim 1 wherein (b) is a copolymer of an alkyl β-vinylpropionate having one to four carbon atoms in the alkyl group and dibutyl fumarate.

References Cited by the Examiner

UNITED STATES PATENTS 2,475,273  7/1949  Adelson et al. _____ 260—897

E. J. Booman et al.: Journal of Chemical Society, 568 (1933), copy in Scientific Library.

OTHER REFERENCES

LEON J. BERCOVITZ, Examiner.

MURRAY TILLMAN, Primary Examiner.

J. A. KOLASCH, J. L. WHITE, Assistant Examiners.